(12) United States Patent
Lin

(10) Patent No.: US 9,143,068 B2
(45) Date of Patent: Sep. 22, 2015

(54) ESTIMATING METHOD FOR A ROTOR POSITION OF A MOTOR AND ESTIMATING DEVICE FOR THE SAME

(71) Applicant: DELTA ELECTRONICS, INC., Taoyuan Hsien (TW)

(72) Inventor: Yi-Cherng Lin, Taoyuan Hsien (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 34 days.

(21) Appl. No.: 14/160,534

(22) Filed: Jan. 21, 2014

(65) Prior Publication Data

US 2015/0042249 A1 Feb. 12, 2015

(30) Foreign Application Priority Data

Aug. 8, 2013 (TW) .............................. 102128403 A

(51) Int. Cl.
*H03K 5/00* (2006.01)
*H02P 6/18* (2006.01)
*H02P 21/00* (2006.01)

(52) U.S. Cl.
CPC ............ *H02P 6/183* (2013.01); *H02P 21/0053* (2013.01)

(58) Field of Classification Search
CPC ......... H02P 21/146; H02P 6/185; H02P 6/18; H02P 21/0039; H02P 2203/11; H02P 21/0053; H02P 21/04; H02P 21/14; H02P 21/141; H02P 23/14; H02P 29/022; H02P 6/183; H02P 21/0035; H02P 21/0042
USPC ................... 318/400.02, 400.32, 400.33, 727
See application file for complete search history.

(56) References Cited

U.S. PATENT DOCUMENTS 6,784,634 B2    8/2004   Sweo
6,989,668 B2 *   1/2006   Mayes ....................... 318/254.1
(Continued)

FOREIGN PATENT DOCUMENTS

JP      2008-00453     1/2008
TW        340991 A     9/1998
(Continued)

OTHER PUBLICATIONS

J. H. Jang, S. K. Sul, J. I. Ha, K. Ide, and M. Sawamura, "Sensorless drive of surface-mounted permanent-magnet motor by high-frequency signal injection based on magnetic saliency," IEEE Trans. Ind. Applicat., vol. 39, pp. 1031-1039, Jul./Aug. 2003.
(Continued)

*Primary Examiner* — Paul Ip
(74) *Attorney, Agent, or Firm* — CKC & Partners Co., Ltd.

(57) ABSTRACT

An estimating method for a rotor position of a motor and an estimating device for the same are disclosed herein. The estimating method includes injecting a first high frequency signal to the motor at a first estimating angle, generating a first sensing signal of the motor in a period when the first high frequency signal is injected to the motor, injecting a second high frequency signal to the motor at a second estimating angle, generating a second sensing signal of the motor in a period when the second high frequency signal is injected to the motor, determining a quadrant of an operating angle according to the first sensing signal and the second sensing signal, and acquiring the rotor position according to the first sensing signal, the second sensing signal, and the quadrant of the operating angle.

15 Claims, 3 Drawing Sheets

(56) References Cited

U.S. PATENT DOCUMENTS

| | | |
|---|---|---|
| 7,294,988 B2 | 11/2007 | Ajima et al. |
| 7,443,130 B2 * | 10/2008 | Takao et al. ............... 318/806 |
| 7,602,139 B2 * | 10/2009 | Ho ............................ 318/806 |
| 7,679,299 B2 * | 3/2010 | Winterhalter et al. ...... 318/135 |
| 8,159,161 B2 * | 4/2012 | Tomigashi ............ 318/400.02 |
| 8,159,168 B2 * | 4/2012 | Liu et al. ............. 318/400.33 |
| 8,217,605 B2 * | 7/2012 | Balazovic et al. ..... 318/400.33 |
| 8,258,736 B2 * | 9/2012 | Patel et al. ........... 318/400.33 |
| 2003/0062870 A1 * | 4/2003 | Royak et al. ................ 318/727 |
| 2003/0169015 A1 * | 9/2003 | Royak et al. ................ 318/727 |
| 2004/0245983 A1 * | 12/2004 | Mayes .................... 324/207.16 |
| 2004/0263111 A1 * | 12/2004 | Royak et al. ................ 318/798 |
| 2005/0057212 A1 * | 3/2005 | Harbaugh et al. .......... 318/809 |
| 2007/0132424 A1 * | 6/2007 | Takao et al. ................ 318/806 |
| 2008/0048599 A1 * | 2/2008 | Ho ......................... 318/400.33 |
| 2008/0300820 A1 * | 12/2008 | Hu ............................... 702/147 |
| 2009/0033272 A1 * | 2/2009 | Winterhalter et al. ...... 318/650 |
| 2009/0039810 A1 * | 2/2009 | Gotz et al. ............ 318/400.32 |
| 2009/0184598 A1 * | 7/2009 | Nakano et al. .......... 310/156.78 |
| 2009/0200974 A1 * | 8/2009 | Yasui ..................... 318/400.33 |
| 2010/0045218 A1 * | 2/2010 | Tomigashi ............ 318/400.02 |
| 2010/0301790 A1 * | 12/2010 | Liu et al. .............. 318/400.33 |
| 2011/0089876 A1 * | 4/2011 | Patel et al. ............ 318/400.33 |
| 2011/0199031 A1 * | 8/2011 | Balazovic et al. ..... 318/400.33 |
| 2013/0033254 A1 * | 2/2013 | Shinnaka .................... 324/160 |

FOREIGN PATENT DOCUMENTS

| | | |
|---|---|---|
| TW | 200943687 A | 10/2009 |
| TW | 201136133 A | 10/2011 |
| TW | I360287 B | 3/2012 |
| TW | 201234762 A | 8/2012 |

OTHER PUBLICATIONS

J. H. Jang, J. I. Ha, M. Ohto, K. Ide, and S. K. Sul, "Analysis of permanent-magnet machine for sensorless control based on high-frequency signal injection," IEEE Trans. Ind. Applicat., vol. 40, pp. 1595-1604, Nov./Dec. 2004.

* cited by examiner

ESTIMATING METHOD FOR A ROTOR POSITION OF A MOTOR AND ESTIMATING DEVICE FOR THE SAME

RELATED APPLICATIONS

This application claims priority to Taiwan Application Serial Number 102128403, filed Aug. 8, 2013, which is herein incorporated by reference.

BACKGROUND

1. Field of Invention

The present disclosure relates to an estimating method for a rotor position of a motor and an estimating device for the same.

2. Description of Related Art

With advances in technology, motors are widely used in our daily lives. For example, motors are used in hard disks, air conditioners, cranes, and so on.

A permanent magnet synchronous motor (PMSM) includes a plurality of stators and a rotor. The stators can be fabricated by wires, and are disposed around the rotor. The rotation of the rotor can be controlled by controlling currents applied to the stators.

In a control (or an activation) of the PMSM, it is necessary to first estimate the rotor position of the PMSM, after which the currents can be provided to the stators to rotate the rotor according to the estimated rotor position of the PMSM. If there is a large deviation between the estimated rotor position and an actual rotor position, the rotor may rotate in the wrong rotational direction or control of the PMSM may fail, resulting in operational instability of the PMSM.

Thus, an estimating method for accurately estimating the rotor position of a motor is desired.

SUMMARY

One aspect of the present invention is directed to an estimating method for a rotor position of a motor. In accordance with one embodiment of the present invention, the estimating method includes injecting a first high frequency signal to the motor at a first estimating angle, generating a first sensing signal of the motor in a period when the first high frequency signal is injected to the motor, injecting a second high frequency signal to the motor at a second estimating angle, generating a second sensing signal of the motor in a period when the second high frequency signal is injected to the motor, determining a quadrant of an operating angle according to the first sensing signal and the second sensing signal, and acquiring the rotor position according to the first sensing signal, the second sensing signal, and the quadrant of the operating angle. The second estimating angle is different from the first estimating angle. The operating angle is twice as large as an angle difference between the first estimating angle and the rotor position.

Another aspect of the present invention is directed to an estimating device for estimating a rotor position of a motor. In accordance with one embodiment of the present invention, the estimating device is electrically connected to the motor. The estimating device includes a high frequency signal injection module, a sensing module, and a calculating module. The high frequency signal injection module is configured to inject a first high frequency signal to the motor at a first estimating angle, and inject a second high frequency signal to the motor at a second estimating angle. The second estimating angle is different from the first estimating angle. The sensing module is configured to generate a first sensing signal of the motor in a period when the first high frequency signal is injected to the motor, and generate a second sensing signal of the motor in a period when the second high frequency signal is injected to the motor. The calculating module is configured to determine a quadrant of an operating angle according to the first sensing signal and the second sensing signal, and acquire the rotor position according to the first sensing signal, the second sensing signal, and the quadrant of the operating angle. The operating angle is twice as large as an angle difference between the first estimating angle and the rotor position.

Thus, through application of one of the embodiments mentioned above, the estimating device can rapidly determine the quadrant of the operating angle according to the first sensing signal and the second sensing signal, so as to acquire the rotor position. Through such operation, the stability of the motor can be effectively increased.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
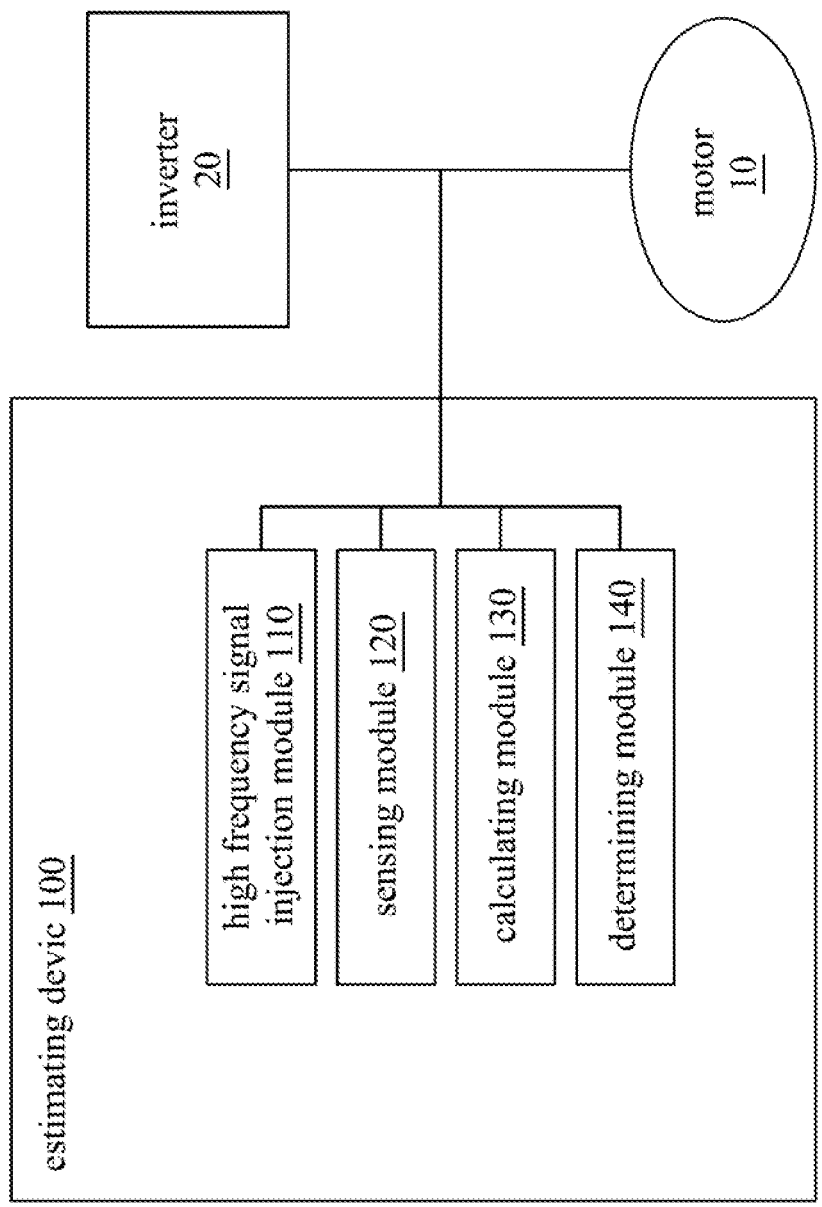
FIG. 1 is a schematic diagram of an estimating device in accordance with one embodiment of the present disclosure.

In the following detailed description, for purposes of explanation, numerous specific details are set forth in order to attain a thorough understanding of the disclosed embodiments. It will be apparent, however, that one or more embodiments may be practiced without these specific details. In other instances, well-known structures and devices are schematically shown in order to simplify the drawing.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

Any element in a claim that does not explicitly state "means for" performing a specified function, or "step for" performing a specific function, is not to be interpreted as a "means" or "step" clause as specified in 35 U.S.C. §112, 6th paragraph. In particular, the use of "step of" in the claims herein is not intended to invoke the provisions of 35 U.S.C. §112, 6th paragraph.

Figure 2:
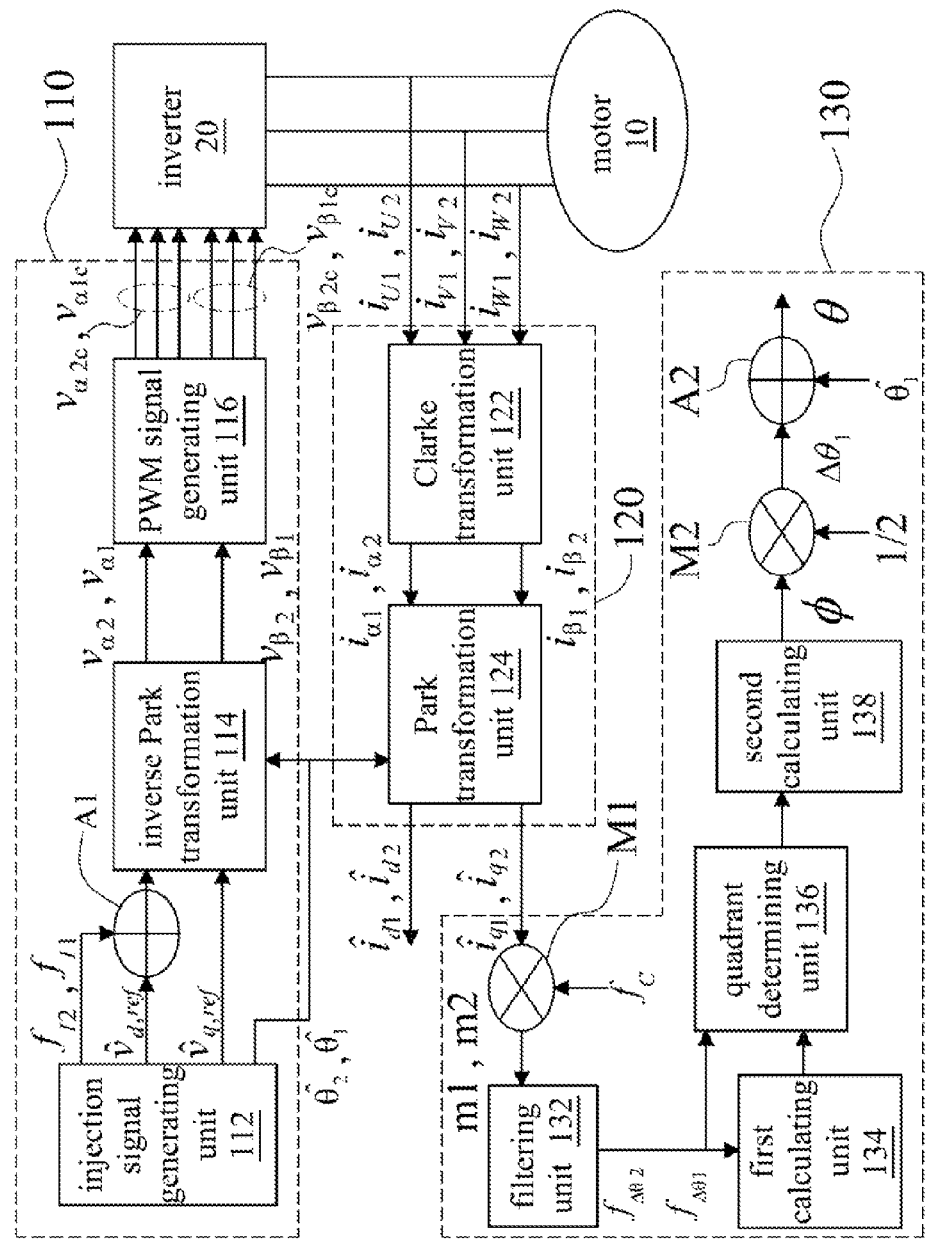
FIG. 2 is a schematic diagram of a high frequency signal injection module, a sensing module, and a calculating module in the estimating device in accordance with one embodiment of the present disclosure.

One aspect of the present invention is an estimating device for estimating a rotor position of a motor. To facilitate the description to follow, reference is made to FIG. 1 and FIG. 2, in which FIG. 1 is a schematic diagram of an estimating device 100 in accordance with one embodiment of the present disclosure, and FIG. 2 is a schematic diagram of a high frequency signal injection module 110, a sensing module 120, and a calculating module 130 in the estimating device 100 in accordance with one embodiment of the present disclosure.

The estimating device 100 is electrically connected to a motor 10 and an inverter 20, and is configured to estimate a rotor position (or a rotor angle) θ of a rotor of the motor 10. The estimating device 100 can be realized by a computer or a circuit assembly. The motor 10 can be a permanent magnet synchronous motor (PMSM). The inverter 20 can be realized by a plurality of transistors.

In this embodiment, the estimating device 100 includes the high frequency signal injection module 110, the sensing module 120, the calculating module 130, and a determining module 140. The high frequency signal injection module 110, the sensing module 120, the calculating module 130, the determining module 140, the inverter 20, and the motor 10 can be electrically connected to each other. Each of the high frequency signal injection module 110, the sensing module 120, the calculating module 130, and the determining module 140 can be realized by software or hardware.

It should be noted that the ways in which the estimating device 100, the motor 10, the inverter 20, the high frequency signal injection module 110, the sensing module 120, the calculating module 130, and the determining module 140 are realized are not limited by the embodiments described above. In addition, the connections among these devices and modules are not limited by the embodiments described above. Any configuration of these devices and interconnections thereamong that would enable the estimating device 100 to practice the technical features described below can be used herein.

In this embodiment, the high frequency signal injection module 110 is configured to inject a first high frequency signal $f_{11}$ to the motor 10 at a first estimating angle $\hat{\theta}_1$ through the inverter 20, as illustrated in FIG. 2. In one embodiment, the high frequency signal injection module 110 can provide first space vector pulse width modulation (SVPWM) signals $v_{\alpha 3c}, v_{\beta 1c}$, to the inverter 20 to make the inverter 20 generate stator currents $i_{U1}, i_{V1}, i_{W1}$, and provide the stator currents $i_{U1}, i_{V1}, i_{W1}$, to the motor 20. In addition, the high frequency signal injection module 110 is further configured to inject a second high frequency signal $f_{12}$ to the motor 10 at a second estimating angle (or a disturbing angle) $\hat{\theta}_2$ through the inverter 20. In one embodiment, the high frequency signal injection module 110 can provide second SVPWM signals $v_{\alpha 2c}, v_{\beta 2c}$, to the inverter 20 to make the inverter 20 generate stator currents $i_{U2}, i_{V2}, i_{W2}$, and provide the stator currents $i_{U2}, i_{V2}, i_{W2}$, to the motor 20. In this embodiment, the second estimating angle $\hat{\theta}_2$ is different from the first estimating angle $\hat{\theta}_1$. Moreover, in one embodiment, there is a tiny disturbing difference between the first estimating angle $\hat{\theta}_1$ and the second estimating angle $\hat{\theta}_2$.

The sensing module 120 is configured to sense the stator currents $i_{U2}, i_{V1}, i_{W1}$, on the motor 10 and generate a first sensing signal (e.g., at least one of response currents $\hat{i}_{d1}, \hat{i}_{q1}$, of the motor 10) according to the stator currents $i_{U1}, i_{V1}, i_{W1}$, in the period when the high frequency signal injection module 110 injects the first high frequency signal $f_{11}$ to the motor 10. In addition, the sensing module 120 is further configured to sense the stator currents $i_{U2}, i_{V2}, i_{W2}$ on the motor 10 and generate a second sensing signal (e.g., at least one of response currents $\hat{i}_{d2}, \hat{i}_{q2}$ of the motor 10) according to the stator currents $i_{U2}, i_{V2}, i_{W2}$, in the period when the high frequency signal injection module 110 injects the second high frequency signal $f_{12}$ to the motor 10.

The calculating module 130 is configured to acquire values of a sine function of an operating angle φ and a cosine function of the operating angle φ according to the first sensing signal and the second sensing signal, and determine a quadrant of the operating angle φ according to whether each of the values of the sine function of the operating angle φ and the cosine function of the operating angle φ is a positive number or a negative number. In this embodiment, the operating angle φ corresponds to an angle difference $\Delta\theta_1$ between the first estimating angle $\hat{\theta}_1$ and the rotor position θ (e.g., $\Delta\theta_1=\theta-\hat{\theta}_1$). In one embodiment, the operating angle is twice as large as the angle difference $\Delta\theta_1$ between the first estimating angle $\hat{\theta}_1$ and the rotor position θ (e.g., $\phi=2\times\Delta\theta_1$).

Subsequently, the calculating module 130 is configured to calculate the value of the operating angle φ through an inverse trigonometric function according to the values of the sine function of the operating angle φ and the cosine function of the operating angle φ. Next, the calculating module 130 is configured to calculate a value of the rotor position θ according to the operating angle φ, the quadrant of the operating angle φ, and the first estimating angle φ.

After the value of the rotor position θ is calculated, the determining module 140 is configured to determine a direction of a magnetic north pole of the rotor of the motor 10 using a pulse injection method. Hence, the rotor position θ of the motor 10 can be ascertained.

To better explain the estimating device 100, one exemplary embodiment thereof is described in the following paragraphs. However, the invention is not limited by the exemplary embodiment described below.

In this exemplary embodiment, in a period when the high frequency signal injection module 110 injects the first high frequency signal $f_{11}$ with a value $U_i \cos \omega_i t$ ($U_i$ and $\omega_i$ can be regarded as constants herein) to a d-axis of the motor 10 at the first estimating angle $\hat{\theta}_1$, the sensing module 120 can sense the stator currents $i_{U1}, i_{V1}, i_{W1}$, on the motor 10, and accordingly generate the response current $\hat{i}_{d1}$ on the d-axis of the motor 10 and the response current $\hat{i}_{q1}$ on the q-axis of the motor 10. Values of the response currents $\hat{i}_{d1}, \hat{i}_{q1}$ can be presented as the following equation:

$$\begin{bmatrix} \hat{i}_{d1} \\ \hat{i}_{q1} \end{bmatrix} = \begin{bmatrix} \frac{U_i \sin\omega_i t}{\omega_i(L^2-\Delta L^2)}(L-\Delta L\cos2\Delta\theta 1) \\ \frac{-U_i \sin\omega_i t}{\omega_i(L^2-\Delta L^2)}\Delta L\sin 2\Delta\theta 1 \end{bmatrix} \quad \text{Eq (1)}$$

In Eq(1), L and ΔL can be regarded as constants herein.

The calculating module 130 samples the response current $\hat{i}_{q1}$ and mixes (or multiplies) the response current $\hat{i}_{q1}$ with a high frequency carrier $f_c$ having a value $\sin \omega_i t$ to generate a first mixing signal m1. Subsequently, the calculating module 130 low-pass filters the first mixing signal m1 to acquire a first calculating value $f_{\Delta\theta 1}$. The first calculating value $f_{\Delta\theta 1}$ can be presented by the following equation:

$$f_{\Delta\theta 1} = k\sin 2\Delta\theta 1, \; k = \frac{-U_i}{2\omega_i(L^2-\Delta L^2)}\Delta L \quad \text{Eq (2)}$$

Through the equation above, the value of the sine function of the angle 2Δθ1 can be acquired, that is, the value of the sine function of the operating angle φ can be acquired.

Additionally, when Eq(2) is differentiated by the angle $\hat{\theta}_1$, the cosine function of the angle $2\Delta\theta_1$ can be acquired. The equation can be presented as follows:

$$\frac{df_{\Delta\theta 1}}{d\hat{\theta}_1} = k\cos 2\Delta\theta_1 \cdot \frac{d(2\Delta\theta_1)}{d\hat{\theta}_1} = k\cos 2\Delta\theta_1 \cdot (-2) \qquad \text{Eq (3)}$$

To solve the equation above, the high frequency signal injection module 110 injects a second high frequency signal $f_{12}$ with a value $U_i \cos \omega_i t$ to the d-axis of the motor 10 at the second estimating angle $\hat{\theta}_2$. The sensing module 120 senses the stator currents $i_{U2}, i_{V2}, i_{W2}$, on the motor 10, and accordingly generates the response current $\hat{i}_{d2}$, on the d-axis of the motor 10 and the response current $\hat{i}_{q2}$ on the q-axis of the motor 10. Subsequently, the calculating module 130 samples the response current $\hat{i}_{q2}$ and mixes (or multiplies) the response current $\hat{i}_{q2}$ with the high frequency carrier $f_c$ having the value sin, wt to generate a second mixing signal m2. Subsequently, the calculating module 130 low-pass filters the second mixing signal m2 to acquire a second calculating value $f_{\Delta\theta 2}$. In a state where there is a tiny difference between the first estimating angle $\hat{\theta}_1$ and the second estimating angle $\hat{\theta}_2$ (e.g., $\hat{\theta}_2 - \hat{\theta}_1 = d\theta$), Eq(3) presented above can be solved by the first estimating angle $\hat{\theta}_1$, the second estimating angle $\hat{\theta}_2$, the first calculating value $f_{\Delta\theta 1}$, and the second calculating value $f_{\Delta\theta 2}$, such that the value of the cosine function of the angle $2\Delta\theta 1$ (that is, the cosine function of the operating angle $\phi$) can be acquired. The equation can be presented as follows:

$$\frac{f_{\Delta\theta 2} - f_{\Delta\theta 1}}{\hat{\theta}_2 - \hat{\theta}_1} = \frac{df_{\Delta\theta 1}}{d\hat{\theta}_1} = k\cos 2\Delta\theta_1 \cdot \frac{d(2\Delta\theta_1)}{d\hat{\theta}_1} = k\cos 2\Delta\theta_1 \cdot (-2) \qquad \text{Eq (4)}$$

After the values of the sine function and the cosine function of the angle $2\Delta\theta 1$ are acquired, the calculating module 130 determines the quadrant of the angle $2\Delta\theta 1$ accordingly. For example, when both of the values of $k \sin 2\Delta\theta_1$ and $k \cos 2\Delta\theta_1$ are positive numbers, the angle $2\Delta\theta 1$ is in the first quadrant. When the value of $k \sin 2\Delta\theta_1$ is a positive number, and the value of $k \cos 2\Delta\theta_1$ is a negative number, the angle $2\Delta\theta 1$ is in the second quadrant.

Additionally, after the values of the sine function and the cosine function of the angle $2\Delta\theta 1$ are acquired, the calculating module 130 calculates the angle difference $\Delta\theta_1$ between the first estimating angle $\hat{\theta}_1$ and the rotor position $\theta$ through the inverse trigonometric function. The equation can be presented as follows:

$$2\Delta\theta_1 = \tan^{-1}\left(f_{\Delta\theta 1} \div \left(\frac{df_{\Delta\theta 1}}{d\hat{\theta}_1}\right) \times (-2)\right) \qquad \text{Eq (5)}$$

Through such operation, the calculating module 130 can calculate the rotor position $\theta$ according to the angle difference $\Delta\theta_1$ between the first estimating angle $\hat{\theta}_1$ and the rotor position $\theta$ (since $\Delta\theta_1 = \theta - \hat{\theta}_1$, and both of $\Delta\theta_1$ and $\hat{\theta}_1$ are known).

It should be noted that although the first high frequency signal $f_{11}$ and the second high frequency signal $f_{12}$ are injected to the d-axis of the motor 10, and the calculating module 130 samples the response currents $\hat{i}_{q1}, \hat{i}_{q2}$ on the q-axis of the motor 10, so as to generate the first calculating value $f_{\Delta\theta 1}$ and the second calculating value $f_{\Delta\theta 2}$ in the exemplary embodiment above, the invention is not limited by such operation.

In one embodiment, in the period when a high frequency signal with a value $U_i \cos \omega_i t$ is injected to the q-axis of the motor 10, the response currents $\hat{i}_d, \hat{i}_q$ respectively on the d-axis and q-axis can be presented as follows:

$$\begin{bmatrix} \hat{i}_d \\ \hat{i}_q \end{bmatrix} = \begin{bmatrix} \dfrac{-U_i \sin\omega_i t}{\omega_i(L^2 - \Delta L^2)} \Delta L \sin 2\Delta\theta \\ \dfrac{U_i \sin\omega_i t}{\omega_i(L^2 - \Delta L^2)} (L + \Delta L \cos 2\Delta\theta) \end{bmatrix} \qquad \text{Eq (6)}$$

In the equation above, $\Delta\theta = \theta - \hat{\theta}$.

In this embodiment, the calculating module 130 can sample the response current $\hat{i}_d$ on the d-axis of the motor 10, mix the response current $\hat{i}_d$ with the high frequency carrier $f_c$ having the value $\sin \omega_i t$ to generate a mixing signal, and low-pass filter the mixing signal to acquire a calculating value $f_{\Delta\theta} = k \sin 2\Delta\theta$. Therefore, in this embodiment, through operations similar to those in the exemplary embodiment above, the values of the sine function and the cosine function of the angle $2\Delta\theta 1$ can be acquired, and the rotor position $\theta$ can be accordingly calculated. A description in this regard will not be repeated herein.

In one embodiment, in the period when a high frequency signal with a value $U_i \cos \omega_i t$ is injected to the d-axis and the q-axis of the motor 10 at the same time, the response currents $\hat{i}_d, \hat{i}_q$, respectively on the d-axis and q-axis can be presented as follows:

$$\begin{bmatrix} \hat{i}_d \\ \hat{i}_q \end{bmatrix} = \begin{bmatrix} \dfrac{U_i \sin\omega_i t}{\omega_i(L^2 - \Delta L^2)} (L - \Delta L \cos 2\Delta\theta - \Delta L \sin 2\Delta\theta) \\ \dfrac{U_i \sin\omega_i t}{\omega_i(L^2 - \Delta L^2)} (L + \Delta L \cos 2\Delta\theta - \Delta L \sin 2\Delta\theta) \end{bmatrix} \qquad \text{Eq (7)}$$

In this embodiment, the calculating module 130 can sample the response current $\hat{i}_d$ on the d-axis of the motor 10, mix the response current $\hat{i}_d$ with the high frequency carrier $f_c$ having the value $\sin \omega_i t$ to generate a mixing signal, and low-pass filter the mixing signal to acquire a calculating value $f_{\Delta\theta\text{-}d}$. In addition, the calculating module 130 can sample the response current $\hat{i}_q$ on the q-axis of the motor 10, mix the response current $\hat{i}_q$ with the high frequency carrier $f_c$ having the value $\sin \omega_i t$ to generate another mixing signal, and low-pass filter the another mixing signal to acquire a calculating value $f_{\Delta\theta\text{-}q}$. The calculating values $f_{\Delta\theta\text{-}d}, f_{\Delta\theta\text{-}q}$ can be presented as follows:

$$\begin{bmatrix} f_{\Delta\theta\text{-}d} \\ f_{\Delta\theta\text{-}q} \end{bmatrix} = \begin{bmatrix} \dfrac{U_i}{2\omega_i(L^2 - \Delta L^2)} (L - \Delta L \cos 2\Delta\theta - \Delta L \sin 2\Delta\theta) \\ \dfrac{U_i}{2\omega_i(L^2 - \Delta L^2)} (L + \Delta L \cos 2\Delta\theta - \Delta L \sin 2\Delta\theta) \end{bmatrix} \qquad \text{Eq (8)}$$

An equation Eq(9) can be derived using equation Eq(8). The equation Eq(9) is presented as follows:

$$\begin{bmatrix} f_{\Delta\theta\text{-}q} - f_{\Delta\theta\text{-}d} \\ \dfrac{df_{\Delta\theta\text{-}d}}{d\hat{\theta}} - \dfrac{df_{\Delta\theta\text{-}q}}{d\hat{\theta}} \end{bmatrix} = \begin{bmatrix} \dfrac{U_i}{2\omega_i(L^2 - \Delta L^2)} (2\Delta L \cos 2\Delta\theta) \\ \dfrac{U_i}{2\omega_i(L^2 - \Delta L^2)} (2\Delta L \sin 2\Delta\theta) \cdot (-2) \end{bmatrix} \qquad \text{Eq (9)}$$

Therefore, in this embodiment, through operations similar to those in the exemplary embodiment above, the values of the sine function and the cosine function of the angle 2Δθ1 can be acquired using Eq(9), and the rotor position θ can be accordingly calculated. A description in this regard will not be repeated herein.

Through such operation, by providing the first high frequency signal $f_{11}$ and the second high frequency signal $f_{12}$ to the motor 10 at the first estimating angle $\hat{\theta}_1$ and the second estimating angle $\hat{\theta}_2$ respectively, the estimating device 100 can rapidly determine the quadrant of the operating angle φ, so as to rapidly calculate the value of the operating angle φ to acquire the rotor position θ. Through application of the estimating device 100, the control of the motor 10 can be more stable.

In the following paragraphs, more details of the high frequency signal injection module 110, the sensing module 120, and the calculating module 130 are provided. However, the invention is not limited by the embodiments below.

As mentioned above, the high frequency signal injection module 110 is configured to inject the first high frequency signal $f_{11}$ to the motor 10 at the first estimating angle $\hat{\theta}_1$ through the inverter 20, and inject the second high frequency signal $f_{12}$ to the motor 10 at the second estimating angle $\hat{\theta}_2$ through the inverter 20.

To achieve such a function, in this embodiment, the high frequency signal injection module 110 includes an injection signal generating unit 112, an adder A1, an inverse Park transformation unit 114, and a pulse width modulation (PWM) signal generating unit 116 (e.g., a space vector pulse width modulation (SVPWM) signal generating unit). The injection signal generating unit 112 is electrically connected to a q-axis input end of the inverse Park transformation unit 114 and the adder A1. The adder A1 is electrically connected to a d-axis input end of the inverse Park transformation unit 114. The inverse Park transformation unit 114 is electrically connected to the PWM signal generating unit 116. The PWM signal generating unit 116 is electrically connected to the inverter 20.

The injection signal generating unit 112 is configured to separately generate the first high frequency signal $f_{11}$ and the second high frequency signal $f_{12}$, a d-axis reference signal $\hat{v}_{d,ref}$, a q-axis reference signal $\hat{v}_{q,ref}$, the first estimating angle $\hat{\theta}_1$, and the second estimating angle $\hat{\theta}_2$. Both of the values of the first high frequency signal $f_{11}$ and the second high frequency signal $f_{12}$ are, for example, $U_i \cos \omega_i t$. Both of the values of the d-axis reference signal $\hat{v}_{d,ref}$ and the q-axis reference signal $\hat{v}_{q,ref}$ are, for example, zero. The value of the first estimating angle $\hat{\theta}_1$ is, for example, zero. The value of the second estimating angle $\hat{\theta}_2$ is, for example, $d\hat{\theta}_1$. Additionally, both of the first high frequency signal $f_{11}$ and the second high frequency signal $f_{12}$ are voltage signals.

The adder A1 is configured to receive the first high frequency signal $f_{11}$, the second high frequency signal $f_{12}$, and the d-axis reference signal $\hat{v}_{d,ref}$, separately add the first high frequency signal $f_{11}$ with the d-axis reference signal $\hat{v}_{d,ref}$ and the second high frequency signal $f_{12}$ with the d-axis reference signal $\hat{v}_{d,ref}$, and transmit the added signals to the d-axis input end of the inverse Park transformation unit 114.

In a period when receiving the first estimating angle $\hat{\theta}_1$, the inverse Park transformation unit 114 is configured to generate first converting signals $v_{\alpha 1}$, $v_{\beta 1}$ according to the first estimating angle $\hat{\theta}_1$, the first high frequency signal $f_{11}$, the d-axis reference signal $\hat{v}_{d,ref}$, and the q-axis reference signal $\hat{v}_{q,ref}$. Additionally, in a period when receiving the second estimating angle $\hat{\theta}_2$, the inverse Park transformation unit 114 is configured to generate second converting signals $v_{\alpha 2}$, $v_{\beta 2}$ according to the second estimating angle $\hat{\theta}_2$, the second high frequency signal $f_{12}$, the d-axis reference signal $\hat{v}_{d,ref}$, and the q-axis reference signal $\hat{v}_{q,ref}$.

When receiving the first converting signal $v_{\alpha 1}$, $v_{\beta 1}$ (e.g., in the period when the inverse Park transformation unit 114 receives the first estimating angle $\hat{\theta}_1$), the PWM signal generating unit 116 is configured to provide first SVPWM signals $v_{\alpha 1 c}$, $v_{\beta 1 c}$ corresponding to the first frequency signal $f_{11}$ to the inverter 20. When receiving the second converting signal $v_{\alpha 2}$, $v_{\beta 2}$ (e.g., in the period when the inverse Park transformation unit 114 receives the second estimating angle $\hat{\theta}_2$), the PWM signal generating unit 116 is configured to provide second SVPWM signals $v_{\alpha 2 c}$, $v_{\beta 2 c}$ corresponding to the second frequency signal $f_{12}$ to the inverter 20.

Through such a configuration, the high frequency signal injection module 110 can inject the first high frequency signal $f_{11}$ to the motor 10 at the first estimating angle $\hat{\theta}_1$ through the inverter 20, and inject the second high frequency signal $f_{12}$ to the motor 10 at the second estimating angle $\hat{\theta}_2$ through the inverter 20.

It should be noted that, in the embodiment above, since the adder A1 is electrically connected to the d-axis input end of the inverse Park transformation unit 114, the first high frequency signal $f_{11}$ and the second high frequency signal $f_{12}$ are injected to the d-axis of the motor 10. However, as mentioned in the paragraphs above, the first high frequency signal $f_{11}$ and the second high frequency signal $f_{12}$ can be injected to the q-axis of the motor 10, or injected to the d-axis and q-axis of the motor 10. Thus, the invention is not limited by the embodiment described above.

As mentioned above, the sensing module 120 is configured to sense the stator currents $i_{U1}, i_{V1}, i_{W1}, i_{U2}, i_{V2}, i_{W2}$ on the motor 10, and accordingly generate the response currents $\hat{i}_{q1}$, $\hat{i}_{q2}$ on the d-axis of the motor 10 and the response currents $\hat{i}_{q1}$, $\hat{i}_{q2}$ on the q-axis of the motor 10. The first sensing signal is at least one of the response currents $\hat{i}_{d1}$, $\hat{i}_{q1}$, and the second sensing signal is at least one of the response currents $\hat{i}_{d2}$, $\hat{i}_{q2}$.

In this embodiment, the sensing module 120 includes a Clarke transformation unit 122 and a Park transformation unit 124. The Clarke transformation unit 122 and the Park transformation unit 124 are electrically connected to each other.

The Clarke transformation unit 122 is configured to receive the stator currents $i_{U1}, i_{V1}, i_{W1}$ of the motor 10, and generate converting signals $i_{\alpha 1}, i_{\beta 1}$ according to the stator currents $i_{U1}, i_{V1}, i_{W1}$. Additionally, the Clarke transformation unit 122 is configured to receive the stator currents $i_{U2}, i_{V2}, i_{W2}$ of the motor 10, and generate converting signals $i_{\alpha 2}, i_{\beta 2}$ according to the stator currents $i_{U2}, i_{V2}, i_{W2}$.

The Park transformation unit 124 is configured to receive the converting signals $i_{\alpha 1}, i_{\beta 1}$, and generate response currents $\hat{i}_{d1}, \hat{i}_{q1}$, according to the converting signals $i_{\alpha 1}, i_{\beta 1}$. Additionally, the Park transformation unit 124 is configured to receive the converting signals $i_{\alpha 2}, i_{\beta 2}$, and generate response currents $\hat{i}_{d2}, \hat{i}_{q2}$ according to the converting signals $i_{\alpha 2}, i_{\beta 2}$.

Through such a configuration, in the period when the high frequency signal injection module 110 injects the first high frequency signal $f_{11}$ to the motor 10, the sensing module 120 can accordingly generate the response current $\hat{i}_{q1}$ on the d-axis of the motor 10 and the response currents $\hat{i}_{q1}$ on the q-axis of the motor 10. Additionally, in the period when the high frequency signal injection module 110 injects the second high frequency signal $f_{12}$ to the motor 10, the sensing module 120 can accordingly generate the response current $\hat{i}_{d2}$ on the d-axis of the motor 10 and the response currents $\hat{i}_{q2}$ on the q-axis of the motor 10.

As mentioned above, the calculating module 130 is configured to calculate the operating angle φ and the rotor position θ according to the first sensing signal (e.g., at least one of response currents $\hat{i}_{d2}$, $\hat{i}_{q2}$) and the second sensing signal (e.g., at least one of response currents $\hat{i}_{d2}$, $\hat{i}_{q2}$).

In this embodiment, the calculating module 130 includes a mixer M1, a filtering unit 132, a first calculating unit 134, a quadrant determining unit 136, a second calculating unit 138, a mixer M2, and an adder A2. The mixer M1 is electrically connected to a q-axis output end of the Park transformation unit 124 and the filtering unit 132. The filtering unit 132 is electrically connected to the first calculating unit 134 and the quadrant determining unit 136. The first calculating unit 134 is electrically connected to the quadrant determining unit 136. The quadrant determining unit 136 is electrically connected to the second calculating unit 138. The second calculating unit 138 is electrically connected to the mixer M2. The mixer M2 is electrically connected to the adder A2.

In this embodiment, the mixer M1 is configured to receive the response current $\hat{i}_{q1}$ (e.g., the first sensing signal in this embodiment) and the response current $\hat{i}_{q2}$ (e.g., the second sensing signal in this embodiment) from the q-axis output end of the Park transformation unit 124. Additionally, the mixer M1 is configured to receive the high frequency carrier $f_c$ (e.g., the high frequency carrier $f_c$ has a value sin ω$_i$t). The mixer M1 is configured to mix the first sensing signal $\hat{i}_{q1}$ with the high frequency carrier $f_c$ to generate the first mixing signal m1, and mix the second sensing signal $\hat{i}_{q2}$ with the high frequency carrier $f_c$ to generate the second mixing signal m2.

The filtering unit 132 is configured to sequentially receive the first mixing signal m1 and the second mixing signal m2, and sequentially low-pass filter the first mixing signal m1 and the second mixing signal m2 to respectively generate the first calculating value $f_{\Delta\theta1}$ and the second calculating value $f_{\Delta\theta2}$. The value of the sine function of the operating angle φ can be acquired according to the first calculating value $f_{\Delta\theta1}$.

The first calculating unit 134 is configured to acquire the value of the cosine function of the operating angle φ according to the first calculating value $f_{\Delta\theta1}$, the second calculating value $f_{\Delta\theta2}$, the first estimating angle $\hat{\theta}_1$ and the second estimating angle $\hat{\theta}_2$.

Subsequently, the quadrant determining unit 136 is configured to determine the quadrant of the operating angle φ according to the values of the sine function and the cosine function of the operating angle θ.

The second calculating unit 138 is configured to calculate the value of the operating angle φ through the inverse trigonometric function according to the values of the sine function and the cosine function of the operating angle φ.

Subsequently, the mixer M2 is configured to generate the angle difference Δθ$_1$ between the first estimating angle $\hat{\theta}_1$ and the rotor position θ according to the operating angle φ.

Next, the adder A2 is configured to generate the rotor position θ according to the angle difference Δθ$_1$ between the first estimating angle $\hat{\theta}_1$ and the rotor position θ.

It should be noted that details of the units in this embodiment can be ascertained by referring to the exemplary embodiment mentioned above, and a description in this regard will not be repeated herein.

Through such a configuration, the calculating module 130 can calculate the operating angle φ and the rotor position θ according to the first sensing signal (e.g., response current $\hat{i}_{q1}$) and the second sensing signal (e.g., response current $\hat{i}_{q2}$).

In addition, since the mixer M1 samples the response currents $\hat{i}_{q1}$, $\hat{i}_{q2}$ on the q-axis output end of the Park transformation unit 124, in the embodiment above, the response current $\hat{i}_{q1}$ serves as the first sensing signal, the response current $\hat{i}_{q2}$ serves as the second sensing signal, and the calculating module 130 calculates the operating angle φ and the rotor position θ according to the response currents $\hat{i}_{q1}$, $\hat{i}_{q2}$. However, as mentioned above, the calculating module 130 can sample the response currents $\hat{i}_{d1}$, $\hat{i}_{d2}$ on the d-axis output end of the Park transformation unit 124, or sample the response currents $\hat{i}_{d1}$, $\hat{i}_{d2}$, $\hat{i}_{q1}$, $\hat{i}_{q2}$ on the d-axis output end and the q-axis output end of the Park transformation unit 124. That is, in some embodiments, the response currents $\hat{i}_{d1}$, $\hat{i}_{d2}$ can serve as the first sensing signal and the second sensing signal respectively, or the response currents $\hat{i}_{d1}$, $\hat{i}_{q1}$ and $\hat{i}_{d2}$, $\hat{i}_{q2}$ can serve as the first sensing signal and the second sensing signal respectively. The invention is not limited in this regard by the embodiment described above.

Another aspect of the present invention is an estimating method for a rotor position of a motor.

The estimating method can be applied to an estimating device having a structure that is the same as or similar to the structure shown in FIG. 1 and FIG. 2. To simplify the description below, in the following paragraphs, the embodiments shown in FIG. 1 and FIG. 2 will be used as an example to describe the estimating method according to embodiments of the present disclosure. However, the invention is not limited to application to the embodiments shown in FIG. 1 and FIG. 2.

In addition, it should be noted that, in the steps of the following estimating method, no particular sequence is required unless otherwise specified. Moreover, the following steps also may be performed simultaneously or the execution times thereof may at least partially overlap.

Figure 3:
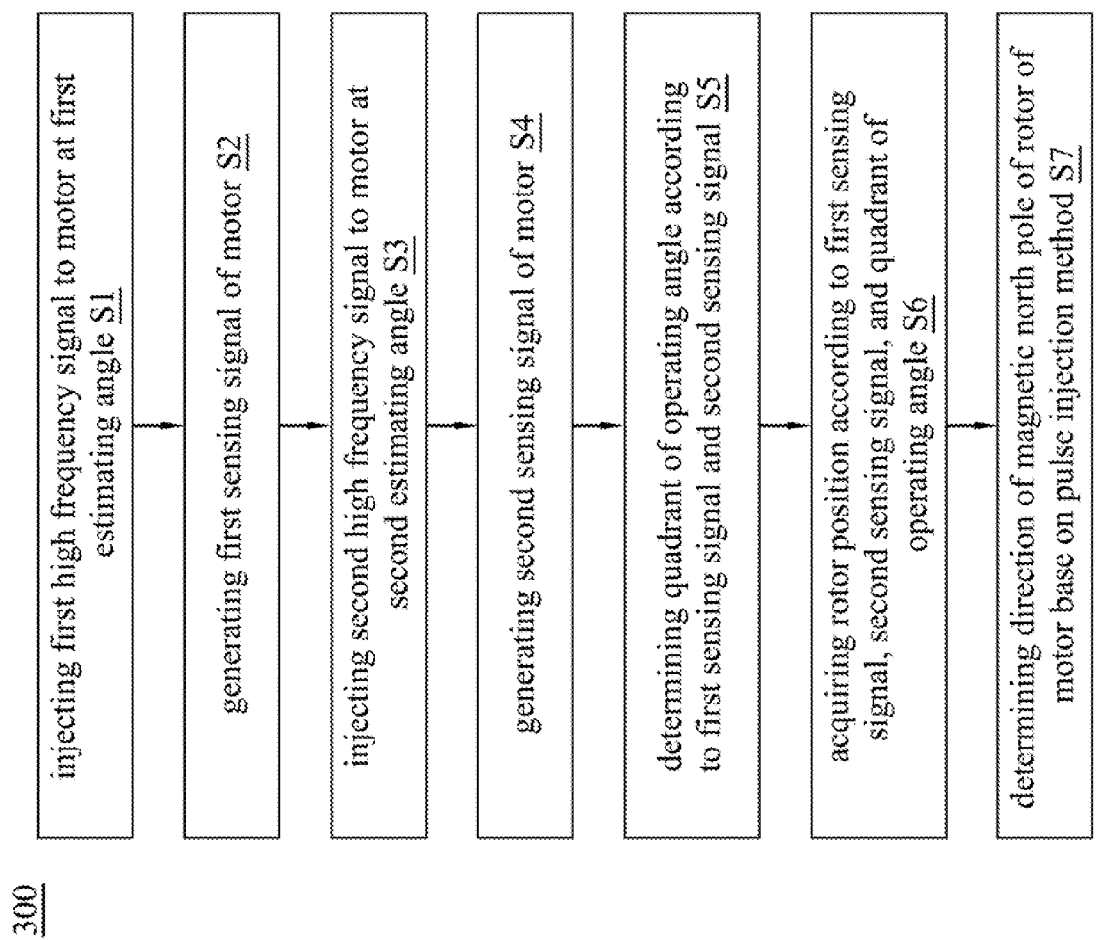
FIG. 3 is a flow chart of an estimating method in accordance with one embodiment of the present disclosure.

FIG. 3 is a flow chart of an estimating method 300 in accordance with one embodiment of the present disclosure. The estimating method 300 includes the steps below.

In step S1, through the high frequency signal injection module 110 and the inverter 20, the first high frequency signal $f_{11}$ is injected to the motor 10 at the first estimating angle $\hat{\theta}_1$.

In step S2, through the sensing module 120, in the period when the first high frequency signal $f_{11}$ is injected to the motor 10, the stator currents $i_{U1}$, $i_{V1}$, $i_{W1}$ of the motor 10 are sensed, and the first sensing signal of the motor 10 is generated according to the stator currents $i_{U1}$, $i_{V1}$, $i_{W1}$.

In step S3, through the high frequency signal injection module 110 and the inverter 20, the second high frequency signal $f_{12}$ is injected to the motor 10 at the second estimating angle $\hat{\theta}_2$. The second estimating angle $\hat{\theta}_2$ is different from the first estimating angle $\hat{\theta}_1$.

In step S4, through the sensing module 120, in the period when the second high frequency signal $f_{12}$ is injected to the motor 10, the stator currents $i_{U2}$, $i_{V2}$, $i_{W2}$ of the motor 10 are sensed, and the second sensing signal of the motor 10 is generated according to the stator currents $i_{U2}$, $i_{V2}$, $i_{W2}$.

In step S5, through the calculating module 130, the values of the sine function and the cosine function of the operating angle φ are acquired, and the quadrant of the operating angle φ is determined according to whether each of the values of the sine function and the cosine function of the operating angle φ is a positive number or a negative number. The operating angle φ corresponds to the angle difference Δθ$_1$ between the first estimating angle $\hat{\theta}_1$ and the rotor position θ (e.g., Δθ$_1$=θ−$\hat{\theta}_1$). In one embodiment, the operating angle φ is twice as large as the angle difference Δθ$_1$ between the first estimating angle $\hat{\theta}_1$ and the rotor position θ (e.g., φ=2×Δθ1).

In step S6, through the calculating module 130, the value of the operating angle φ is calculated through the inverse trigonometric function according to the values of the sine function and the cosine function of the operating angle φ. Subsequently, the calculating module 130 calculates the rotor position θ according to the operating angle φ, the quadrant of the operating angle φ, and the first estimating angle φ.

In step S7, through the determining module 140, the direction of the magnetic north pole of the rotor of the motor 10 is determined using the pulse injection method. Hence, the rotor position θ of the motor 10 can be ascertained.

Through such operation, by providing the first high frequency signal $f_{11}$ and the second high frequency signal $f_{12}$ to the motor 10 at the first estimating angle $\hat{\theta}_1$ and the second estimating angle $\hat{\theta}_2$ respectively, the estimating device 100 can rapidly determine the quadrant of the operating angle φ, so as to rapidly calculate the value of the operating angle φ to acquire the value of the rotor position θ. Through application of the estimating device 100, the control of the motor 10 can be more stable.

In accordance with one embodiment, the first sensing signal is at least one of the response current $\hat{i}_{d1}$ on the d-axis of the motor 10 and the response current $\hat{i}_{q1}$ on the q-axis of the motor 10. The second sensing signal is at least one of the response current $\hat{i}_{d2}$ on the d-axis of the motor 10 and the response current $\hat{i}_{q2}$ on the q-axis of the motor 10.

In accordance with one embodiment, in step S1, the high frequency signal injection module 110 injects the first high frequency signal $f_{11}$ to at least one of the d-axis and the q-axis of the motor 10 at the first estimating angle $\hat{\theta}_1$.

In accordance with one embodiment, in step S3, the high frequency signal injection module 110 injects the second high frequency signal $f_{12}$ to at least one of the d-axis and the q-axis of the motor 10 at the second estimating angle $\hat{\theta}_2$. The first high frequency signal $f_{11}$ and the second high frequency signal $f_{12}$ are injected to the same q-axis of the motor 10, the same d-axis of the motor 10, or both of the q-axis and the d-axis of the motor 10.

In accordance with one embodiment, in step S5, the calculating module 130 mixes the first sensing signal with the high frequency carrier $f_c$ to generate the first mixing signal m1, and low-pass filters the first mixing signal m1 to acquire a first calculating value $f_{\Delta\theta1}$. The calculating module 130 acquires the value of the sine function of the operating angle φ according to the first calculating value $f_{\Delta\theta1}$.

Additionally, in accordance with one embodiment, in step S5, the calculating module 130 mixes the second sensing signal with the high frequency carrier $f_c$ to generate the second mixing signal m2, and low-pass filters the second mixing signal m2 to acquire a second calculating value $f_{\Delta\theta2}$. Subsequently, the calculating module 130 acquires the value of the cosine function of the operating angle according to the first calculating value $f_{\Delta\theta1}$, the second calculating value $f_{\Delta\theta2}$, the first estimating angle, and the second estimating angle $\hat{\theta}_2$.

Moreover, in accordance with one embodiment, in step S5, the calculating module 130 calculates the value of the operating angle φ through an inverse trigonometric function according to the values of the sine function and the cosine function of the operating angle φ. Subsequently, the calculating module 130 calculates the value of the rotor position θ according to the operating angle φ, the quadrant of the operating angle φ, and the first estimating angle $\hat{\theta}_1$.

It should be noted that details of steps S1-S7 can be ascertained by referring to the exemplary embodiment mentioned above, and a description in this regard will not be repeated herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An estimating method for a rotor position of a motor comprising:
    injecting, by using a computer, a first high frequency signal to the motor at a first estimating angle;
    generating, by using a computer, a first sensing signal of the motor in a period when the first high frequency signal is injected to the motor;
    injecting, by using a computer, a second high frequency signal to the motor at a second estimating angle, wherein the second estimating angle is different from the first estimating angle;
    generating, by using a computer, a second sensing signal of the motor in a period when the second high frequency signal is injected to the motor;
    determining, by using a computer, a quadrant of an operating angle according to the first sensing signal and the second sensing signal, wherein the operating angle is twice as large as an angle difference between the first estimating angle and the rotor position; and
    acquiring, by using a computer, the rotor position according to the first sensing signal, the second sensing signal, and the quadrant of the operating angle.

2. The estimating method as claimed in claim 1, wherein the step of determining the quadrant of the operating angle according to the first sensing signal and the second sensing signal comprises:
    acquiring a sine function of the operating angle and a cosine function of the operating angle according to the first sensing signal and the second sensing signal; and
    determining the quadrant of the operating angle according to the sine function of the operating angle and the cosine function of the operating angle.

3. The estimating method as claimed in claim 2, wherein the step of acquiring the sine function of the operating angle and the cosine function of the operating angle according to the first sensing signal and the second sensing signal comprises:
    mixing the first sensing signal and a high frequency carrier to generate a first mixing signal;
    low-pass filtering the first mixing signal to acquire a first calculating value;
    acquiring the sine function of the operating angle according to the first calculating value;
    mixing the second sensing signal and the high frequency carrier to generate a second mixing signal;
    low-pass filtering the second mixing signal to acquire a second calculating value; and
    acquiring the cosine function of the operating angle according to the first calculating value, the second calculating value, the first estimating angle, and the second estimating angle.

4. The estimating method as claimed in claim 2, wherein the step of acquiring the rotor position comprises:
    calculating the operating angle through an inverse trigonometric function according to the sine function of the operating angle and the cosine function of the operating angle; and
    calculating the rotor position according to the operating angle, the quadrant of the operating angle, and the first estimating angle.

5. The estimating method as claimed in claim 1 further comprising:
    determining a direction of a magnetic north pole of the rotor of the motor using a pulse injection method.

6. The estimating method as claimed in claim 1, wherein the step of injecting the first high frequency signal to the motor at the first estimating angle comprises:

injecting the first high frequency signal to at least one of a q-axis of the motor and a d-axis of the motor at the first estimating angle;

and the step of injecting the second high frequency signal to the motor at the second estimating angle comprises:
injecting the second high frequency signal to at least one of the q-axis of the motor and the d-axis of the motor at the second estimating angle.

7. The estimating method as claimed in claim 1, wherein the first sensing signal is at least one of a first response current on a d-axis of the motor and a second response current on a q-axis of the motor, and the second sensing signal is at least one of a third response current on the d-axis of the motor and a fourth response current on the q-axis of the motor.

8. An estimating device for estimating a rotor position of a motor, wherein the estimating device is electrically connected to the motor, the estimating device comprising a computer, the computer comprising:
a high frequency signal injection module configured to inject a first high frequency signal to the motor at a first estimating angle, and inject a second high frequency signal to the motor at a second estimating angle, wherein the second estimating angle is different from the first estimating angle;
a sensing module configured to generate a first sensing signal of the motor in a period when the first high frequency signal is injected to the motor, and generate a second sensing signal of the motor in a period when the second high frequency signal is injected to the motor; and
a calculating module configured to determine a quadrant of an operating angle according to the first sensing signal and the second sensing signal, and acquire the rotor position according to the first sensing signal, the second sensing signal, and the quadrant of the operating angle, wherein the operating angle is twice as large as an angle difference between the first estimating angle and the rotor position.

9. The estimating device as claimed in claim 8, wherein the calculating module is further configured to acquire a sine function of the operating angle and a cosine function of the operating angle according to the first sensing signal and the second sensing signal, and determine the quadrant of the operating angle according to the sine function of the operating angle and the cosine function of the operating angle.

10. The estimating device as claimed in claim 9, wherein the calculating module is further configured to mix the first sensing signal and a high frequency carrier to generate a first mixing signal, low-pass filter the first mixing signal to acquire a first calculating value, and acquire the sine function of the operating angle according to the first calculating value.

11. The estimating device as claimed in claim 10, wherein the calculating module is further configured to mix the second sensing signal and the high frequency carrier to generate a second mixing signal, low-pass filter the second mixing signal to acquire a second calculating value, and acquire the cosine function of the operating angle according to the first calculating value, the second calculating value, the first estimating angle, and the second estimating angle.

12. The estimating device as claimed in claim 9, wherein the calculating module is further configured to calculate the operating angle through an inverse trigonometric function according to the sine function of the operating angle and the cosine function of the operating angle, and calculate the rotor position according to the operating angle, the quadrant of the operating angle, and the first estimating angle.

13. The estimating device as claimed in claim 8 further comprising:
a determining module configured to determine a direction of a magnetic north pole of the rotor of the motor using a pulse injection method.

14. The estimating device as claimed in claim 8, wherein the high frequency signal injection module is further configured to inject the first high frequency signal to at least one of a q-axis of the motor and a d-axis of the motor at the first estimating angle, and inject the second high frequency signal to at least one of the q-axis of the motor and the d-axis of the motor at the second estimating angle.

15. The estimating device as claimed in claim 8, wherein the first sensing signal is at least one of a first response current on a d-axis of the motor and a second response current on a q-axis of the motor, and the second sensing signal is at least one of a third response current on the d-axis of the motor and a fourth response current on the q-axis of the motor.

* * * * *